United States Patent Office 3,836,589
Patented Sept. 17, 1974

3,836,589
METHOD FOR THE OXIDATION OF HYDROCARBONS
Howard P. Angstadt, Media, Pa., assignor to Sun Oil Company, Philadelphia, Pa.
No Drawing. Filed Sept. 24, 1969, Ser. No. 860,816
Int. Cl. C07c 73/06
U.S. Cl. 260—610 B
4 Claims

ABSTRACT OF THE DISCLOSURE

Hydrocarbon oxidation processes utilizing water-sensitive catalysts, wherein said processes yield water as a by-product, may be improved by carrying out the oxidation in the presence of a desiccant which is inert to the reaction conditions of the process.

BACKGROUND OF THE INVENTION

This invention relates to an improved process for the oxidation of hydrocarbon. More particularly, it relates to a method of improving hydrocarbon oxidation processes which yield water as a by-product, wherein said processes utilize water-sensitive catalysts, by carrying out said processes in the presence of an inert desiccant.

In copending applications, U.S. Ser. No. 772,421 filed Oct. 31, 1968; U.S. Ser. No. 773,633 filed Nov. 5, 1968; U.S. Ser. No. 777,493 filed Nov. 20, 1968; and U.S. Ser. No. 787,582 filed Dec. 27, 1968, in the name of H.P. Angstadt, and Angstadt et al., there are described methods for the oxidation of certain olefins and alkylaromatics wherein the oxidation catalysts comprise various organometallic complexes. These complexes, which are formed by the interaction of transition metal salts with such compounds as hexaalkylphosphoramides, tetraalkylureas, dialkylsulfoxides and trialkylphosphates, have been found to be effective in increasing the rate of oxidation, and more particularly, in selectively forming olefinic and alkylaromatic hydroperoxides. However, each of these processes has been characterized by the loss of effectiveness of these catalysts over relatively short periods of time. This loss, it is believed, is caused by the action of water, produced as a by-product of the process, on the catalysts, which are water-sensitive. It will thus be evident from the foregoing that any method which would prolong the effectiveness of such water-sensitive catalysts without adversely affecting their selectivity or the reaction rate of the process would be highly advantageous.

SUMMARY OF THE INVENTION

It has now been found, in accordance with the present invention, that the effectiveness of water-sensitive hydrocarbon oxidation catalysts can be enhanced in those oxidation processes where water is formed as by a by-product by carrying out said processes in the presence of a desiccant which is inert to the reaction conditions of the process.

DESCRIPTION OF THE INVENTION

The processes to which the hereindescribed improvement are especially applicable include, in particular, those methods described above wherein compounds such as olefins and alkylaromatics are oxidized in the presence of organometallic complex catalysts to form the corresponding hydroperoxides and/or other oxidation products such as ketones, alcohols and the like, together with some water. Accordingly, for sake of simplicity, this invention will be described in detail having reference to some of the methods described and claimed in the aforementioned copending applications. However, it will be understood that the improvement described herein is of general applicability to all hydrocarbon oxidation processes utilizing water-sensitive catalysts where water is formed during the course of the reaction.

The hydrocarbon substrates to which this method applies include, in particular but not exclusively, any organic compound which contains activated carbon-hydrogen bonds. That is to say, it includes those hydrogen-containing carbon atoms such as methylene or methine groups, which are adjacent certain activating groups. These activating groups include such groups as —CH=CH—, —OR, —NO₂, halo, phenyl and the like, where R is alkyl or cycloalkyl.

Included amongst the starting materials which are of particular use in this process are any straight or branched chain unsaturated olefins having at least one hydrogen atom on the α-carbon atoms, such as octene-1, and the like, as well as cyclic olefins, having at least one hydrogen atom on the α-carbon atom, such as cyclohexene, cyclooctadiene, α-pinene, dl-limonene and the like. These olefins may contain substituent groups which are non-reactive under the conditions of this process, as for example, ester, halo, nitro, alkyl or like groups which remain as substituents of the final product.

Also included as preferred starting materials in this process are secondary and tertiary alkylaromatic hydrocarbons having the structural formula:

wherein R is lower alkyl; R₁ is lower alkyl or hydrogen; Ar is a substituted or unsubstituted aromatic nucleus such as phenyl, or naphthyl; and wherein R and R₁ may be the same or different alkyl groups. The aromatic nucleus may be substituted by such groups as lower alkyl, lower alkoxy, halo, nitro or cyano radicals. Preferably, the secondary and tertiary alkylaromatic hydrocarbon is represented by such compounds as cumene, ethylbenzene, or sec.-butylnaphthalene, although it is understood that compounds such as n-butylbenzene, sec.-butylbenzene, isopropylnaphthalene and the like may also be employed. The lower alkyl groups may contain from 1 to 12 carbon atoms.

The catalysts which are benefited by the process of this invention include any catalytic compounds which are sensitive to the presence of water, i.e. those whose activity is impaired or destroyed by water formed during the course of the reaction. Amongst these, as mentioned above, are such organometallic complexes as are formed between transition metals, including those of the lanthanide and actinide series, and such compounds as hexaalkylphosphoramides, dialkylsulfoxides, tetraalkylurea, trialkylphosphates, amine oxides, tetraalkyl ammonium isothiocyanates, triarylphosphates, acetylacetonates, trialkyl or triarylphosphine oxides, tristhiophosphates, pyridine N-oxides and the like.

The metal salts used in forming the complexes are those derived from transition metals of groups IIIB, IVB, VB, VIB, VIIB, VIIIB, IB, IIA or IIB, including the lanthanide and actinide metals. Of particular interest are such metals as Co, Ni, Mn, Cu, Ag, Pd, Pt, Rh, Mo, Cr, La, Cs, Nd and Gd. The anions of these salts may be any inorganic groups, although the chlorides, bromides, nitrates, perchlorates and carbonates are generally preferred.

The preparation of these organometallic complexes is known to those skilled in the art. In general, the preparation of these complexes may be achieved by mixing a hydrate of the metal salt with an excess of the complexing material and recovering the resultant crystals in a known manner. Alternatively, the complex may be prepared by first dissolving the metal salt in an excess of solvent, preferably an alkanol such as t-butanol, to which solution is added an excess of reagent followed by routine recovery and drying of the resulting precipitate. In some instances the complex does not form a solid which can be recovered readily, if at all, in which case the resulting solution may satisfactorily be employed instead. These organometallic complexes may be employed either as the purified solid or in solution with an excess of the complexing material itself as the preferred solvent therefor.

In the case of the trialkylphosphate metal salt complexes, it is preferable to prepare these materials in one of two ways: (1) by direct fusion of the metal salt with liquid trialkylphosphate, or (2) by first dissolving the metal salt in a suitable reagent followed by addition of the phosphate and evaporation of the liquid medium to recover the complex.

The resulting organometallic complexes, when prepared as described above, have the general formula $$MX_nA_m$$

wherein M is a transition metal as described above, X is the anion of the metal salt; A is the complexed reagent such as tetraalkylurea or the like, $m$ is an integer of from 1 to 8; and $n$ is an integer of from 1 to 4. These catalysts are generally employed in amounts of from about 0.1 to 5.0 parts by weight per 100 parts of substrate.

The desiccants found to be effective in the practice of this process include such materials as $CaCl_2$, $Na_2SO_4$, $MgSO_4$, molecular sieves and the like. While the sodium, calcium and magnesium salts are effective desiccants for purposes of this invention, their usefulness is limited somewhat to those reactions where only relatively small amounts of water are produced. Mole sieves, on the other hand, have been found to be effective over a much wider range of reaction conditions and they are, therefore, preferred. The molecular sieves found to be most useful as desiccants are those having pore diameters of 3, 4 or 5 Angstrom units, i.e. 3A, 4A or 5A mole sieves, and particularly the latter two.

These molecular sieves are well-known in the art and include those natural or synthetic zeolites or aluminosilicates made up of porous crystals wherein the pores of the crystals are of a molecular dimension and of substantially uniform size. Typical among the mole sieves which are suitable in the practice of this invention are those commercially available 3A, 4A and 5A sieves manufactured by Linde Air Products Company and designated, for example, Linde Type 5A Molecular Sieve. This latter material is a synthetic calcium alumino silicate with a 5 Angstrom pore diameter which is a particularly effective desiccant for purpose of this invention.

The mole sieve may be added to the reaction medium either at the beginning of the oxidation or incrementally during the course of the reaction. The amount of mole sieve employed may vary greatly in proportion to the amount of hydrocarbon substrate present, and the proportions are not in any way critical. Generally speaking, however, proportions varying from 1:1 to 20:1 by weight of mole sieve to catalyst have been found to be satisfactory. This amount may readily be adjusted upward or downward, depending upon the amount of water being formed.

The hydrocarbon oxidation processes described herein may readily be carried out with any of the aforedescribed substrates, catalysts and desiccants by rapidly passing air or oxygen through a suitable reactor to which has first been added the starting materials. The air or oxygen should be brought into intimate contact with the liquid phase with vigorous agitation either mechanically by the use of high speed stirrers, or by aeration using suitable nozzles or the like.

Mechanical agitation has been found to be particularly effective in those cases where the rate at which the oxygenating gas is introduced into the reactor is low, i.e. below about 3 liters per hour. Thus, for example, when air is merely introduced at the surface of the reaction mixture, agitation by a commercially available reciprocating disc type stirrer (e.g. "Vibro-Mixer," Chemapec Company, Inc., Hoboken N.J.) has been found to increase the rate of oxidation per hour by as much as four-fold over what is obtained with lesser amounts of agitation.

Alternatively, these increased rates may similarly be achieved, and mechanical agitation substantially or entirely dispensed with by appreciably increasing the rate at which air or oxygen is introduced into the reaction medium. This is preferably accomplished by bubbling the oxygenating gas through the reaction mixture, vigorously, desirably in such a manner as to insure maximum dispersal of the gas through the medium, as for example, by using fritted glass discs or the like. Depending upon the amount of liquid medium involved, the rate of oxygenating gas may generally vary from about 3 to 300 liters per hour.

The amount of catalyst employed will vary depending upon the nature of the catalyst itself. In general, however, from about 0.01 to 5.0 parts by weight of catalyst per 100 parts of substrate, and preferably from 0.2 to 1.0 parts per 100 parts has been found to be satisfactory.

The rate of input of oxygen or air will likewise vary depending upon the reaction temperature and pressure employed. There should be provided an amount at least theoretically sufficient to convert the alkyl aromatic compound to the corresponding hydroperoxide, and preferably an excess of this amount. In general, a flow rate ranging from 0.5 to 300 liters per hour is sufficient for most conversions, and preferably at least 3 liters per hour as described above. While the reaction is preferably carried out at atmospheric pressure, it is possible to employ an oxygen pressure of from about 0.3 atmospheres to 50 atmospheres, and preferably about 1 to 10 atmospheres. At these higher pressures the oxidation rate is found to increase substantially when the organometallic complexes are employed, and particularly those catalysts which are selective for hydroperoxide formation.

The reaction temperature may range from about 80 to 200° C., and preferably from 90 to 150° C.

The reaction is generally run for from half an hour to ten hours, depending upon the amount of substrate employed and the degree of conversion desired. When, however, an hydroperoxide is the principal product being former, it is desirable that the reaction be terminated after a period of one to six hours at which point the reaction rate usually begins to taper off.

Advantageously, when the principal product is an hydroperoxide, small amounts of an hydroperoxide, preferably one corresponding to the desired product, may be introduced into the reaction medium to act as a reaction initiator. Thus, for example, when cumene is being oxidized, it has been found to be advantageous to add small amounts of cumyl hydroperoxide in order to further accelerate the initial rate of reaction. The amount of hydroperoxide to be added is not critical, but 0.1 to 1.0 percent by weight of the starting material is preferred.

The resulting products are readily recovered from the reaction medium by conventional methods. Thus, for example, an hydroperoxide may be conveniently recovered by isolating it as its sodium salt by addition of concentrated aqueous NaOH to the reaction product, followed by separation and drying of the hydroperoxide salt.

These oxidation products are generally alcohols, ketones, hydroperoxides, epoxides or mixtures thereof. Of these various products, maximization of the formation of the hydroperoxides is generally preferred inasmuch as those compounds derived from the alkylaromatic compounds are especially useful as intermediates in the preparation of such products as phenols, naphthols, acetone and the like, while those derived from, e.g. the olefin hydroperoxides, are useful in facilitating the drying capabilities of polymers, i.e. they are useful as siccative agents.

In the following examples, unless otherwise noted, both rate of conversion of the starting material and selectivity of the catalyst for converting the starting material to the corresponding hydroperoxide were measured. To measure rate of conversion, regardless of the nature of the oxidation product, the amount of oxygen uptake in a closed system was used; to measure the amount of hydroperoxide formed, samples of the reaction medium were periodically withdrawn and iodometrically titrated to determine the hydroperoxide content. On the basis of both of these figures the selectivity of any given catalyst for the formation of hydroperoxide could then be routinely determined.

EXAMPLE 1

Oxidation of methyl linoleate with LaCl$_3$·TMP and added 5A mole sieve

In a 50 ml., indented, three-necked flask fitted with a gas inlet tube, reciprocating stirrer and attached to a gas buret was placed 29.4 g. of methyl linoleate (0.10 mole), 0.2 cc. (0.001 mole) of cumene hydroperoxide and 0.066 g. (0.0001 mole) of lanthanum chloride-trimethylphosphate complex and 0.2 g. of 5A mole sieve. The vessel was swept with oxygen, opened to the oxygen-containing gas buret and then immersed in a thermostated oil bath at 100° C. The stirrer was started and the oxygen uptake was measured. Periodically samples were withdrawn and the concentration of hydroperoxide measured iodometrically. From the oxygen uptake and hydroperoxide values the selectivity of the catalyst for hydroperoxide can be readily calculated. Runs were carried out in a similar manner using varying amounts of 5A mole sieve and in the absence of any mole sieve; the results are tabulated below.

TABLE 1

| (Gms.) 5A Mole Sieve: | Percent * Conversion ½ Hour |
|---|---|
| 0 | 19.3 |
| 0.2 | 22.1 |
| 0.5 | 27.7 |

*Based upon the formation of two hydroperoxy groups.

In accordance with the foregoing procedure, but substituting a 4A mole sieve for the 5A mole sieve, and starting with decalin in the presence of MnBr$_2$-trimethylphosphate, there is obtained a corresponding increase, as above, in percentage conversion to the 9-decalylhydroperoxide as compared with a like run where no mole sieve is employed.

EXAMPLE 2

Oxidation of cyclohexene with MnBr$_2$·HPMA and added 5A mole sieve

These oxidations were carried out in a manner similar to the previous examples except that there was used 8.2 g. (0.1 mole) of cyclohexene, the temperature of the oil bath was 65° C. and 0.057 g. of MnBr$_2$-hexamethylphosphoramide as the catalyst. Two runs were made using zero grams and 1.0 g. 5A mole sieve. The results are shown below:

| Gms. 5A Mole Sieve: | Percent Conversion after 1 hr. |
|---|---|
| 0 | 12.9 |
| 1.0 | 24.8 |

In accordance with the foregoing procedure, but substituting a 3A mole sieve for the 5A mole sieve, and starting with dibenzylether in the presence of DyCl$_3$-hexamethylphosphoramide, there is obtained a corresponding increase, as above, in percentage conversion to the bibenzylether hydroperoxide as compared with a like run where no mole sieve is employed.

EXAMPLE 3

Oxidation of cumene with NdCl$_3$·TMU and added 5A mole sieve

Into a 50 ml., three-necked Morton flask equipped with a reciprocating stirrer and attached to a gas buret are placed 12.0 g. (0.10 mole) of cumene, 0.2 g. (0.001 mole) of cumene hydroperoxide, and 0.0599 g. (0.0001 mole) of NdCl$_3$-tetramethylurea complex. The flask is swept with oxygen, closed, immersed in an oil bath at 100° C., stirring started and opened to the gas buret. The absorption of oxygen is recorded and samples are withdrawn periodically and titrated for hydroperoxide content iodometrically. Conversion of cumene averages about 9 percent per hour for the first three hours.

When the above procedure is repeated and 1.0 g. of activated 5A mole sieve is added to the reaction flask, the conversion rate increases to about 12 percent per hour.

In accordance with the foregoing procedure, but starting with tetralin in the presence of NiCl$_2$-dimethylsulfoxide, there is obtained a corresponding increase, as above, in percentage conversion to the tetralin hydroperoxide as compared with a like run where no mole sieve is employed.

What is claimed is:

1. In the process for the catalytic oxidation of compounds selected from the group consisting of (1) straight, branched chain, or cyclic hydrocarbon olefins of not more than 20 carbon atoms and having at least one hydrogen atom on the α-carbon atom, and (2) alkylaromatic hydrocarbons of the formula

wherein R is lower alkyl; R$_1$ is lower alkyl or hydrogen; Ar is phenyl or naphthyl; and wherein R and R$_1$ may be the same or different, by contacting said compounds with air or oxygen at temperatures of about 80 to 200° C. in the presence of a water-sensitive organometallic catalyst of the formula

wherein M is a transition metal of the group IB to VIIIB or IIA of the Periodic Table; X is an anion; A is selected from the group consisting of hexaalkylphosphoramides, dialkylsulfoxides, tetraalkylurea, trialkylphosphates, amine oxides; tetraalkyl ammonium isothiocyanates, triarylphosphates, acetylacetonates, trialkylphosphine oxides, triarylphosphine oxides, tristhiophosphates, and pyridine N-oxides; $m$ is an integer of from 1 to 8; and $n$ is an integer of from 1 to 4 to form a reaction mixture comprising the corresponding hydroperoxides, said olefins or alkylaromatic hydrocarbons containing carbon-hydrogen bonds activated by adjacent activating groups selected from the group consisting of —CH=C, —OR, —NO$_2$, halo or phenyl radicals, wherein R is alkyl or cycloalkyl, and wherein water is formed as a by-product of said oxidation, the improvement comprising carrying out said process in the presence of a desiccant selected from the group consisting of CaCl$_2$, Na$_2$SO$_4$, MgSO$_4$, and natural or synthetic porous crystalline zeolites.

2. The process according to Claim 1 wherein the desiccant is a molecular sieve having a pore diameter of from 3 to 5 Angstrom units.

3. The process according to Claim 1 wherein the metallic component of said organometallic catalyst is of the lanthanide or actinide series of the Periodic Table.

4. The process according to Claim 1 wherein the oxidation is carried out in the presence of an added hydroperoxide.

References Cited

UNITED STATES PATENTS

| 3,524,888 | 8/1970 | Dressler et al. | 260—610 B |
| 3,160,668 | 12/1964 | Davie et al. | 260—610 B |
| 2,734,086 | 2/1956 | Goppel et al. | 260—610 B |
| 2,664,448 | 12/1953 | Loraud et al. | 260—610 B |
| 2,655,545 | 10/1953 | Bruning et al. | 260—610 B |
| 2,776,999 | 1/1957 | Joris | 260—610 B |

FOREIGN PATENTS

| 872,104 | 7/1961 | Great Britain | 260—610 B |

BERNARD HELFIN, Primary Examiner

W. B. LONE, Assistant Examiner